United States Patent [19]

Weir

[11] 3,766,790
[45] Oct. 23, 1973

[54] NON-JAMMING BALL SCREW LINEAR ACTUATOR

[75] Inventor: Norman Weir, Swarthmore, Pa.

[73] Assignee: The Boeing Company, Seattle, Wash.

[22] Filed: Dec. 29, 1971

[21] Appl. No.: 213,498

[52] U.S. Cl. .................... 74/89.15, 74/665, 74/675
[51] Int. Cl. ............................................ F16h 27/02
[58] Field of Search ..................... 74/89.15, 424.8, 74/675, 665

[56] References Cited
UNITED STATES PATENTS

| | | | |
|---|---|---|---|
| 3,237,372 | 3/1966 | Hartman | 74/424.8 R |
| 1,931,071 | 10/1933 | Halstead, Jr. | 74/675 |
| 987,253 | 3/1911 | Neale | 74/665 D |
| 2,519,042 | 8/1950 | Granberg et al. | 74/675 |

FOREIGN PATENTS OR APPLICATIONS 250,718   9/1925   Italy .................................. 74/424.8

Primary Examiner—Charles J. Myhre
Assistant Examiner—Wesley S. Ratiff, Jr.
Attorney—Robert S. Lipton et al.

[57] ABSTRACT

An actuator for moving two elements with respect to one another having structural redundancy so as to maintain the actuator in an operable condition notwithstanding actuator component failures. Two drive mechanisms each connected to an element are mounted on a common track so each is movable with respect to the track. The drive mechanisms are connected to a common shaft which will transmit power from one mechanism to the other in the event of a power loss or other failure in one of the mechanisms.

8 Claims, 2 Drawing Figures

NON-JAMMING BALL SCREW LINEAR ACTUATOR

BACKGROUND OF THE INVENTION

This invention relates generally to actuators and in particular to linear actuators of the type having redundant critical components.

The actuators of the prior art have generally had limited redundancy. Some of these actuators have multiple power sources so as to maintain the actuator in operable condition should the primary power source fail. The desired degree of reliability depending upon the application of the actuator was obtained either by strenuous design requirements of the actuator or by using more than one actuator.

The use of multiple actuators is unsatisfactory for aircraft applications where actuator reliability and dependability bear a direct relationship to the aircraft's ability to maintain flight. Multiple actuators do not in themselves provide the desired degree of reliability and additionally impose a weight penalty, an undesirable characteristic for aircraft use. The present invention provides the necessary reliability by providing redundancy in all critical actuator components and permits, for example, one of the dual motors to operate either one or both of two translating devices. The invention can be applied wherever conventional actuators are used but is particularly suited for aircraft use and is shown in this application by way of example. The invention is particularly suitable for aircraft of the type known as tilt rotor aircraft.

In a tilt rotor aircraft the propulsion is provided by a rotor system mounted on the aircraft wing. The rotor system pivots with respect to the wing while the wing maintains a fixed position with respect to the aircraft fuselage. The present invention would be used to effect tilting of the rotor with respect to the wing.

If the actuator ceased operating at some positions the aircraft would not be able to land in a satisfactory and safe manner. When the rotor is in the vertical position the aircraft is capable of hover type flight. When the rotor is in the horizontal or conventional position the aircraft is capable of flying in the conventional manner. When the rotor is in some intermediate position, that is, during that period of time when the aircraft is in transition from conventional flight to hover, or from hover to conventional flight, should the actuator cease to operate, the aircraft would have substantial difficulty in landing.

Actuators are commonly used as structural members. Specifically, in addition to moving one element relative to another they are used to maintain a particular position once it has been achieved. Should the actuator be removed or certain actuation components fail the two elements would be free to move with respect to one another. An actuator failure which would permit the rotor to swing free with respect to the wing would normally result in the loss of the aircraft. This type of failure could result in the aircraft rotor changing its position relative to the wing at a very rapid rate; this could result in structural failures of various aircraft components. Should an aircraft structural failure not result, the aircraft rotor would be in a free swinging position with respect to the remainder of the aircraft. This could result in dynamic instabilities which could result in loss of control of the aircraft.

In view of these considerations an actuator for this particular purpose must function with a high degree of reliability. The actuator of the present invention has been so designed.

The basic manner in which the present invention overcomes the aforementioned difficulties is by mounting a pair of drive mechanisms on a common track so as to provide dual redundancy. Each of the drive mechanisms includes a motor which operates a translating device in engagement with the track. The drive mechanisms move in opposite directions relative to each other on the track and are mounted such that there is a maximum distance between them when each is located at opposite end of the track and there is a minimum distance between them during normal operation when they are located at the track mid-point. The drive mechanisms are additionally equipped with a device which prevents each from riding free with respect to the track in the event of a structural failure or loss of power to the motor. This in effect locks one of the drive mechanisms with respect to the track while actuation is still provided through the other mechanism.

As a further safeguard, a transmission shaft may connect the two drive mechanisms. The shaft permits the motor of one of the drive mechanisms to operate the second drive mechanism in the event the motor associated with the second drive mechanism fails. This serves to provide an operable actuator in the event there are certain double failures within the system. In addition, the shaft acts to synchronize the two drive mechanisms.

A power failure to the motor or jamming of one of the drive mechanisms and a seizure of the translating device of the other drive mechanism with respect to the track is a particular dual failure that will not cause the preferred embodiment of the invention to cease operating. Each of the drive mechanisms of the preferred embodiment has a differential associated with it. The motor acts through the single input to the differential, which has two outputs. One of the outputs drives the translating device which engages the track while the second output drives the shaft which connects the two drive mechanisms. This enables the actuator to remain operable in the event the translating device of the first drive mechanism seizes with respect to the track and the motor of the second drive mechanism loses power or jams.

In the event of a power failure the output from the motor of the first drive mechanism drives the second drive mechanism as a result of the differential and the transmission shaft. If the motor used in the drive mechanism is of the constant RPM type as is contemplated by the present invention, the actuator will move at one-half its normal velocity since with this type of failure only one of the translating devices is operating.

In the event the motor jams the actuator of the present invention may operate at normal velocity by causing the second drive mechanism to double its speed of operation if the differential used is of the type which will effect a gear change, two to one in this instance. A differential of this type will change gears when one of the two outputs becomes an input and the single input becomes non-rotatable, a condition which is met when the motor jams.

Therefore, a primary object of the invention is to provide a new and improved actuating mechanism.

Another object of the invention is to provide a new and improved actuating mechanism having redundant critical components.

A further object of the present invention is to provide a new and improved actuating mechanism which will remain operable should there be a seizure of one of the translating devices.

Yet another object of the invention is to provide a new and improved actuating mechanism which will remain operable should there be a seizure of the first translating device and the second motor.

Other and further objectives and advantages will be described in the description which follows, taken together with the accompanying drawings.

In the drawing, in which like numerals refer to like parts:

The actuator of the present invention is shown utilized on an aircraft of the tilt rotor type fpr purposes of explanation only, and it is to be understood that the actuator of the present invention is not to be limited to such an application and may be used in most instances where an actuator is required. For purposes of this disclosure the term actuator distance and like terms refers to the distance between the two drive mechanisms of the actuators and the term actuator velocity refers to the speed of one drive mechanism relative to the other. It is desirable that the actuator which is used for this purpose have the maximum degree of reliability possible.

An actuator has a maximum distance through which it will move the two elements to which it is connected. The actuator of the present invention should operate through this distance notwithstanding various actuator component failures. It is desirable that the actuator traverse this distance in the designed amount of time notwithstanding various possible component failures. As a minimum requirement it is desired that the actuator keep the aircraft rotor 36 in a fixed position with respect to the aircraft wing 34 notwithstanding various actuator component failures. The actuator of the present invention will accomplish these objectives notwithstanding various single and multiple actuator component failures.

Figure 2:
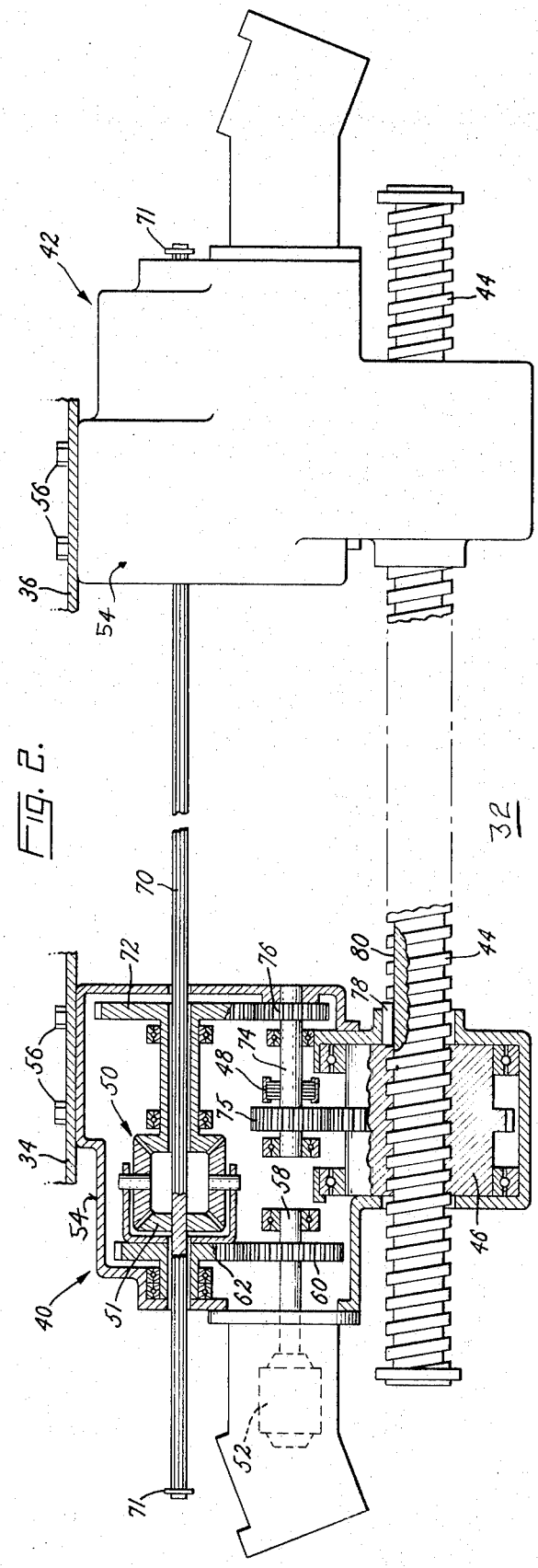
FIG. 2 is a side elevation view of an actuator embodying the present invention.

Referring now to FIG. 2 in which the actuator 32 is shown, identical first and second drive mechanisms 40 and 42 respectively are mounted on a common track or screw 44 in a longitudinally disposed manner. The following discussion will refer to drive mechanism 40 but is equally applicable to drive mechanism 42. The drive mechanism 40 includes a translating device or nut 46. In the preferred embodiment of the invention it is contemplated that the nut 46 will be of the type known to those versed in the art as a ball nut. The drive mechanism 40 also includes a no-back locking device 48, a differential 50, a motor 52 and a housing 54. The actuator 32 is mounted to the tilt rotor aircraft 30 by connecting the first drive mechanism 42 to the rotor by bolts 56. Thus it may be readily seen that as the first drive mechanism 40 and the second drive mechanism 42 vary the distance between them as they move longitudinally on the screw 44, the rotor 36 tilts about the point 38 with respect to the aircraft wing 34.

It is contemplated that the motor 52 will be electrical and of the constant RPM type, though other types including hydraulic motors may be used.

During normal operation of the drive mechanism 40 the rotary output of the motor 52 causes the shaft 58 to rotate which in turn causes rotation of the gear 60 which is connected to the shaft 58. The gear 60 in turn causes the input gear 62 of the differential 50 to rotate. During normal operation the differential 50 has two outputs, one of which drives a shaft 70 and the other which drives the gear 72. Rotary motion of the gear 72 in turn causes the gear 76 to rotate thereby causing the shaft 74 of the no-back locking device 48 to rotate. Rotation of the shaft 74 of the no-back locking device 48 causes the gear 75 to rotate, the teeth of which engage teeth protruding from the ball nut thereby causing the shaft 74 of the no-back locking device 48 to rotate. Rotation of the shaft 74 of the no-back locking device 48 causes the gear 75 to rotate, the teeth of which engage teeth protruding from the ball nut thereby causing the ball nut 46 to rotate. Rotation of the ball nut 46 causes the ball nut 46 and thereby the drive mechanism 40 to move longitudinally along the screw 44. The screw 44 is prevented from rotating due to a key 78, which is rigidly connected to the housing 54, being inserted in a keyway 80 in the screw 44.

The no-back locking device 48 is of a type which is well-known to those versed in the art. For purposes of this disclosure it includes such devices and others which will prevent the gear 75 from rotating unless the gear 76 is first caused to rotate. The no-back locking device of the present invention is of the type which utilizes a first set of metal discs which are grounded to the housing and has interposed a second set of discs between the first set of discs and is attached to the shaft of the no-back locking device. An exmaple of a device other than a no-back locking device which could perform this function is the well-known worm gear wherein a conventional gear engages a screw and the conventional gear will not rotate unless the screw is first caused to rotate.

Figure 1:
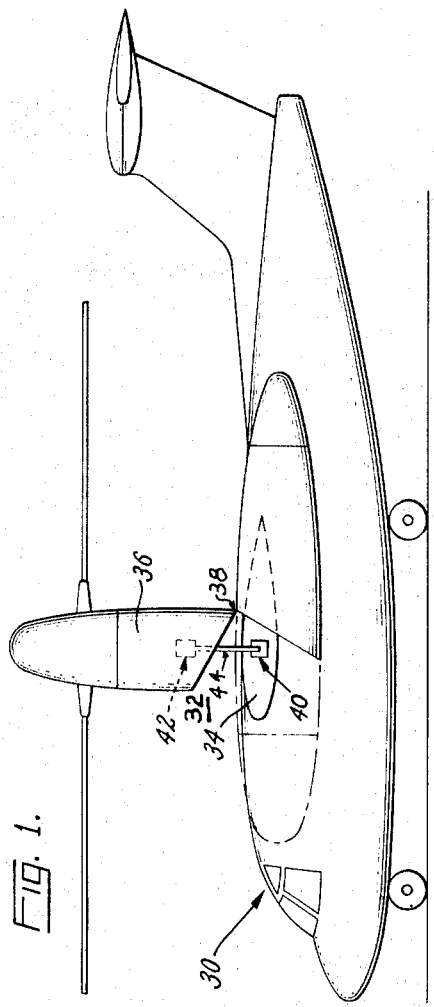
FIG. 1 is a perspective view of a tilt rotor aircraft utilizing the invention.

The shaft 70 interconnects drive mechanisms 40 and 42 and permits power to be transmitted from the motor of one of the drive mechanisms to the ball nut of the other drive mechanism. The transmission shaft is caused to rotate by the teeth of a gear 51 of the differential 50 engaging splines in the shaft 70. The transmission shaft 70 is able to move longitudinally in an unrestrained manner through the gears 51 of the differentials 50. Complete passage of the shaft 70 through the differential 50 is prevented by the stops 71 which are rigidly attached to the shaft 70 and which will abut the housing 54. When the actuator 32 is physically oriented as shown in FIG. 1 gravitational forces will cause such slippage of the shaft 70 through the differential 50 of the drive mechanism 42 which is connected to the rotor 36.

Normally the distance between drive mechanisms 40 and 42 when these are located at opposite ends of screw 44 is the maximum distance of operation of the actuator 32.

The seizure of the ball nut 46 of the drive mechanism 42 with respect to the screw 44 is a type of failure which would cause actuators of the prior art to cease operating. The actuator 32 of the present invention will continue to operate at one-half normal velocity over the maximum distance notwithstanding such a failure.

It is readily apparent that if the ball nut 46 of the drive mechanism 42 is seized with respect to the screw 44 that the gear 75, shaft 74 and the gear 76 of the drive mechanism 42 will be in a fixed position. This necessarily results in the gear 72 of the differential 50 being restrained from moving. The rotary output of the motor 52 of the drive mechanism 42 continues to operate the differential 50 causing the transmission shaft 70 to rotate thereby passing its rotational energy to the remaining operable drive mechanism 40. The drive mechanism 40 which under normal operating conditions was operating at a velocity of x feet per minute will continue to operate at that speed. The actuator 32 thus maintains a dual motor system.

A power loss to the motor 52 of the drive mechanism 40 is another type of possible failure. The shaft 70 continues to rotate due to the normal functioning of the drive mechanism 42. The shaft 70 which is normally one of the outputs of the differential 50 of the drive mechanism 40 causes the gear 72 to continue rotating in the normal manner due to the operation of the differential 50 of the drive mechanism 40. Thus the motor 52 of the drive mechanism 42 drives both drive mechanism 40 and 42 with the result that the actuator 32 operates at normal velocity.

In another situation, the actuator 32 will continue to function, though at one-half its normal velocity, should there be a power failure to the motor 52 of the drive mechanism 40 and a simultaneous failure of the connecting shaft 70. Under this set of circumstances the drive mechanism 42 would continue to operate in the normal manner traversing the screw 44 at a rate of x feet per minute. The drive mechanism 40 will remain in a fixed position with respect to the shaft 44 as a result of the no-back locking device 48 which prevents rotation of the shaft 74 unless a force is exerted by the gear 76, which is impossible in this instance due to the severed connection shaft 70 and the power failure to the motor 52 of the drive mechanism 40. Thus the actuator 32 continues to operate, though at a velocity of $x$ feet per minute, which is one-half the normal operating velocity.

In order to ensure that the acuator 32 will be able to traverse its maximum design distance whenever either of the drive mechanisms 40 or 42 is unable to move with respect to the shaft 44 the shaft 44 should be at least twice the length of the maximum desired actuator travel.

In still another situation the actuator 32 will continue to operate notwithstanding a seizure of the ball nut 46 of the drive mechanism 42 with respect to the screw 44 in conjunction with a power failure to the motor 52 or a jamming of the motor 52 of the drive mechanism 40. The motor 52 of the drive mechanism 42 will continue to rotate the shaft 70 notwithstanding the seized ball nut of the drive mechanism 42. The rotating shaft 70 will drive the differential 50 causing the gear 72 of the drive mechanism 40, notwithstanding the fact that the motor 52 of the drive mechanism is inoperable.

Since the drive mechanism 40 will operate at a velocity of x feet per second, the actuator 32 will be operating at one-half its normal operating velocity. The differential 50 may be of the type which will effect a gear change, two to one in this instance, when the input gear 62 is not free to rotate and when the differential 50 is being driven by the shaft 70, which is normally an output. With this type of differential a jamming of the motor 52 will prevent the gear 62 from rotating, as the shaft 58 and the gear 60 will also be immovable, with the result that the differential 50 of the drive mechanism 40 will effect a gear change provided that the differential 50 is being driven by the shaft 70. This will cause the drive mechanism 40 to operate at a velocity of 2x feet per second, the normal operating velocity of the actuator 32. A power failure to the motor 52 of the drive mechanism 40 will still permit the input gear 62 of the differential 50 to rotate freely with the result that no gear change will take place with the result that the actuator 32 will operate at 1½ times its normal velocity.

A control and power system must be connected to the actuator 32. The system is not shown in the accompanying drawing as such a description is not necessary for adequate explanation of the invention. It is the function of this system to provide electric or hydraulic energy to the motors 52 depending upon their type. The control system provides the pilot of the aircraft with a means for engaging the actuator as his flight requirements dictate. If the actuator is utilized in a tilt rotor aircraft as is contemplated in FIG. 1 the aircraft will require an actuator for each of the two rotors. The control system should be designed such that it will maintain both actuators operating at an identical speed in the event one of the actuators deviates from its normal operating velocity. The control system itself will have many safety features incorporated in its design, the nature of which will be a function of the particular application of the actuator 32.

While a particular embodiment of the present invention has been found and described it will be obvious to those skilled in the art that it may be made without departing from the invention in its broader aspects, and therefore the aim in the appended claims is to cover all such changes and modifications as fall within the true spirit and scope of this invention.

What I claim is:

1. A redundant actuator for moving a first member relative to a second member through a desired range of travel comprising:
    a screw;
    a first and second drive means wherein each includes;
        a housing, wherein the housing of said first drive means is adapted to be connected to the first member and the housing of said second drive means is adapted to be connected to the second member;
        a nut rotatably connected to said housing and rotatably mounted on said screw for translation with respect thereto;
        a no-back locking device connected to said housing and operably connected to said nut for preventing rotation thereof;
        a differential connected to said housing and operably connected to said no-back locking device;
        a motor means connected to said housing and operably connected to said differential; and
    a transmission shaft rotatably and translationally connected to the differential of each of said drive means.

2. A redundant actuator for moving a first member relative to a second member through a desired range of travel comprising:
    a track means;

a first and second drive means operably connected to said track means, longitudinally spaced thereon and translatable with respect thereto, said first drive means adapted to be connected to the first member and said second drive means adapted to be connected to the second member, each drive means including,
  a translating means mounted on said track means for traversing said track means,
  a motor means operably connected to said translating means, and
  a locking means connected to said motor means and to said translating means for locking said translating means to said track means in the event said motor means becomes inoperable; and
an operative means connected to said first and second drive means for permitting independent movement of said first and second drive means relative to each other along said track means substantially through the desired range of travel.

3. The redundant actuator of claim 2 wherein said track means is comprised of a shaft and wherein said translating means are comprised of a nut mounted for rotation upon said screw.

4. The redundant actuator of claim 3 which includes transmission means for driving said translating means of said first drive means by said motor means of said second drive means when the motor means of said first drive means has become inoperable.

5. A redundant actuator for moving a first member relative to a second member through a desired range of travel comprising:
  a track means;
  a first and second drive means operably connected to said track means, longitudinally spaced thereon and translatable with respect thereto, said first and second drive means including,
    a first and second translating means, respectively for traversing said track means, and
    a first and second motor means operatively connected to said first and second translating means respectively for driving said translating means; and
  means for driving said second translating means by said first motor means in the event said second motor means becomes inoperable.

6. The redundant actuator of claim 5 wherein said track means is comprised of a shaft.

7. The redundant actuator of claim 6 wherein said shaft is comprised of a screw and wherein said first and second translating means are comprised of a first and second nut, respectively mounted for rotation upon said screw.

8. The redundant actuator of claim 7 wherein said first and second drive means include a first and second locking means connected to said first motor means and to said first nut and to said second motor means and to said second nut, respectively for locking said nut to said screw in the event said motor means becomes inoperable.

* * * * *